United States Patent
Filimonov

(10) Patent No.: US 12,315,507 B1
(45) Date of Patent: May 27, 2025

(54) AUTOMATIC SPEECH RECOGNITION (ASR) TECHNIQUES

(71) Applicant: Amazon Technologies, Inc., Seattle, WA (US)

(72) Inventor: Denis Filimonov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 17/946,446

(22) Filed: Sep. 16, 2022

(51) Int. Cl.
*G10L 15/22* (2006.01)
*G10L 15/08* (2006.01)
*G10L 15/18* (2013.01)

(52) U.S. Cl.
CPC .......... *G10L 15/22* (2013.01); *G10L 15/083* (2013.01); *G10L 15/1815* (2013.01)

(58) Field of Classification Search
CPC .... G10L 15/22; G10L 15/083; G10L 15/1815
See application file for complete search history.

(56) References Cited

U.S. PATENT DOCUMENTS

| | | | |
|---|---|---|---|
| 11,475,877 B1* | 10/2022 | Tao | G10L 15/1815 |
| 2019/0371311 A1* | 12/2019 | Patel | G06F 3/167 |
| 2023/0223018 A1* | 7/2023 | Xing | G10L 15/22 |
| | | | 704/232 |
| 2024/0029723 A1* | 1/2024 | Balasubramanian | G10L 15/16 |

* cited by examiner

*Primary Examiner* — Stella L. Woo
(74) *Attorney, Agent, or Firm* — Pierce Atwood LLP

(57) ABSTRACT

Techniques for performing automatic speech recognition (ASR) processing are described. The ASR processing may involve use of a segmenter and a decoder. The segmenter may be configured to identify audio segments, from audio data containing speech, based on word boundaries. The decoder may be configured to generate multiple word hypotheses for individual audio segments. A fixed-size representation of an audio segment may be generated. The described ASR processing techniques may be computationally less expensive than at least some other systems. Also, the described ASR processing techniques may maintain a larger number of word predictions per audio segment as compared to at least some other systems.

16 Claims, 8 Drawing Sheets

FIG. 2

| First Audio Segment | Second Audio Segment | Third Audio Segment | Fourth Audio Segment |
|---|---|---|---|
| Word Labels 210 ↗ | Word Labels 220 ↗ | Word Labels 230 ↗ | Word Labels 240 ↗ |
| "I AM" ; [score] | "HUNGRY" ; [score] | "WHAT IS THE" ; [score] | "CLOSET" ; [score] |
| "MY" ; [score] | "ANGRY" ; [score] | "WHAT'S THE" ; [score] | "CLOSEST" ; [score] |
| "I'M" ; [score] | "HUNGARY" ; [score] | "WAIT IS THE" ; [score] | "CLOSER" ; [score] |
| "MIME" ; [score] | "HUNGER" ; [score] | "ATE THE" ; [score] | "CLOSED" ; [score] |
| "HMM" ; [score] | "HANGER" ; [score] | | "CLOSE" ; [score] |

AUTOMATIC SPEECH RECOGNITION (ASR) TECHNIQUES

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Natural language processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 illustrates example confusion network data that may be used to determine ASR output data, according to embodiments of the present disclosure.

DETAILED DESCRIPTION

Figure 1A:
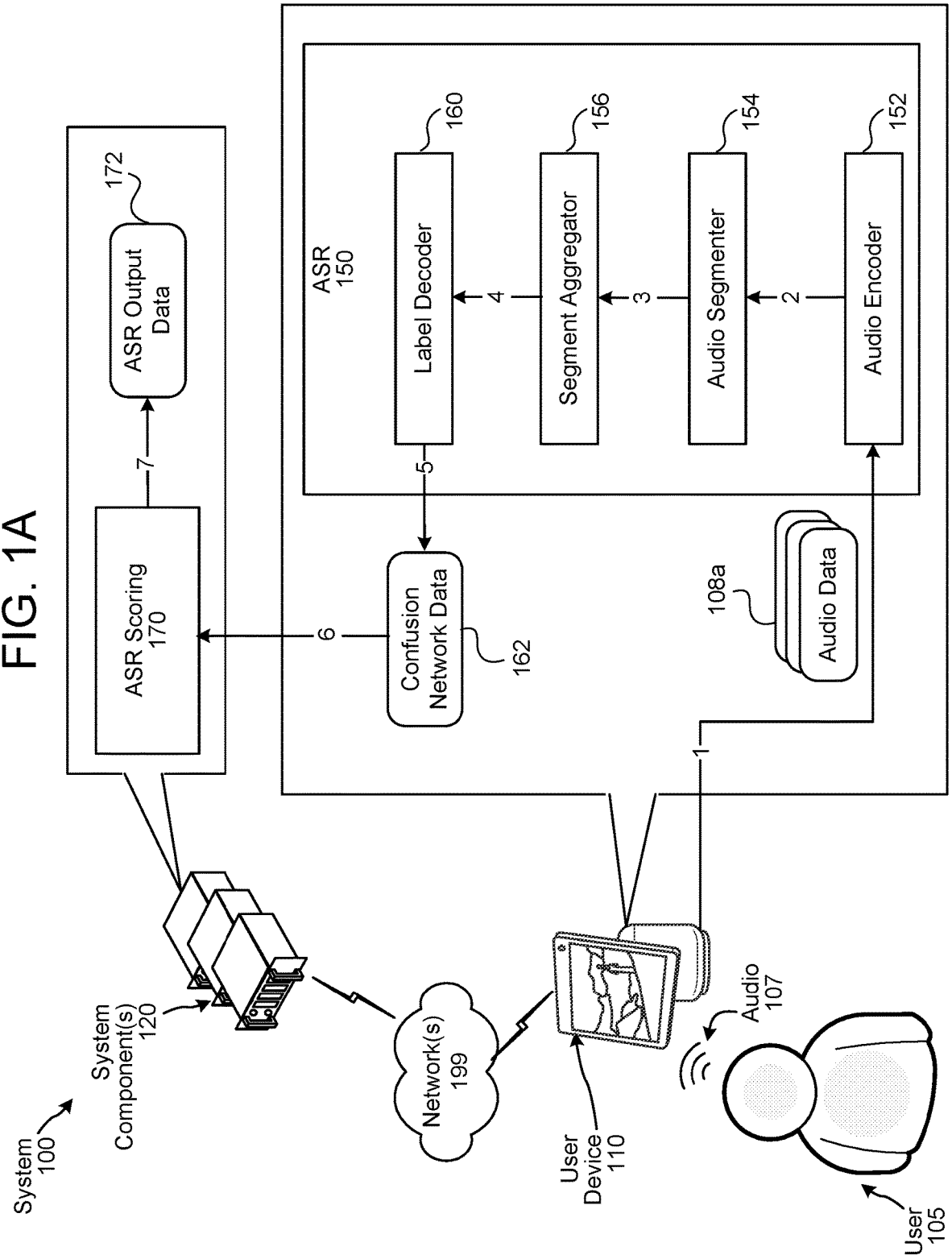
FIG. 1A is a conceptual diagram illustrating a user device performing automatic speech recognition (ASR) processing, according to embodiments of the present disclosure.

Automatic speech recognition (ASR) is a field of computer science, artificial intelligence, and linguistics concerned with transforming audio data associated with speech into data representing the words in the speech (e.g., text). Similarly, natural language understanding (NLU) is a field of computer science, artificial intelligence, and linguistics concerned with enabling computers to derive meaning from word representations. Text-to-speech (TTS) is a field of concerning transforming word representative data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Certain speech processing systems may be configured to perform actions responsive to spoken user inputs. For example, for the user input of "Alexa, play music by [artist]," a system may output music sung by the indicated artist. For further example, for the user input of "Alexa, what is the weather for [city]," a system may output synthesized speech representing weather information for a geographic location of the user. In a further example, for the user input of "Alexa, send a message to John," a system may capture spoken message content and cause same to be output via a device registered to "John."

Some systems use machine learning models to perform ASR processing, which involves transcribing audio data, containing speech, to text (or other forms of data) digitally representing the analog speech. Some systems may use neural networks, such as recurrent neural network transducer (RNN-T) models, to perform ASR processing. RNN-T models can be used to generate desirable ASR results. The present disclosure describes, among other things, improvements to systems that use neural networks, RNN-T models or other such models for ASR processing.

As described herein, neural networks (such as RNN-T or Listen-Attend-Spell (LAS) models) can take in audio representing speech, which is encoded in fixed-size audio frames (e.g., 10 to 30 milliseconds), and output data representing sequences of words. Such neural networks can produce an output based on a configuration such that the next word depends on all the words that came before it. Because machine predictions are not perfect, at every point/prediction, the model can explore some number of hypotheses (sometimes referred to herein as a "beam"). Thus, multiple possible words can be hypothesized, and then the search space following each of these words can be expanded. With a number of hypotheses at each prediction, the search space can expand very rapidly, and to make the task more manageable for the machine, only a small number of the most likely hypotheses may be maintained. The computation resources needed to determine the hypotheses at each point can be relatively considerable, which is another reason for maintaining a small set of hypotheses. In determining the set of hypotheses, sometimes a correct hypothesis is pruned, especially when the correct hypothesis sounds somewhat similar to another one, or due noise in the audio signal. Because the correct hypothesis is already pruned, it can be difficult to restore it when and if it later becomes clear that it was the correct hypothesis.

Neural networks, such as RNN-T models, may utilize a substantial amount of computation resources, especially for implementations where ASR processing is performed on user devices with relatively limited resources and/or other functions competing for the available resources. In such implementations, the models are often constrained further (e.g., reduced in size thereby decreasing accuracy, hypothesis beam is restricted, etc.). One of the reasons to perform ASR processing on user devices is to enhance perceived privacy, so that audio containing user speech is not communicated to a remotely located device (e.g., a server, the cloud, etc.).

The present disclosure describes techniques for, among other things, performing ASR processing in an end-to-end manner on the device the user is speaking to. Some embodiments of the present disclosure involve using an encoder, a segmenter, a segment aggregator, and a decoder to perform ASR processing. The encoder can be configured to encode audio frames that are fixed duration portions of speech. The segmenter can be configured to segment speech based on identifying word boundaries. The segment aggregator can be configured to compute a fixed-size representation of a variable-length segment. The decoder can be configured to generate, from the fixed-size representation, words that are included in the respective segment.

The ASR processing techniques of the present disclosure can involve segmenting speech into defined chunks, where individual chunks can be one or more words of speech, and then each chunk is decoded separately, based on the configuration that each chunk contains enough information to produce hypotheses about what was said in that chunk. This results in a separate set of hypotheses for each chunk, which are then used to generate the best hypotheses for the entire utterance. Since each segment is decoding independently, the output of such a system is a form of a confusion network, which can include a large number of hypotheses, and thus can be more useful for subsequent (re) scoring methods.

Additionally, the ASR processing techniques of the present disclosure can involve encoding each variable length segment into a fixed-length representation, where the size (e.g., memory size) of that representation is small enough to enable user devices with limited resources to perform ASR processing. Furthermore, the fixed-length representations do not necessarily need to be reconstructed to determine the user's speech, and thus, in some embodiments, the fixed-length representations may be communicated to a remotely located device for further processing while enhancing perceived privacy.

Some of the operations of the system of the present disclosure may be performed on a user device, and other of the operations may be performed on a remotely located device and/or another user device near the user. For example, encoding of the audio data, generation of segments corresponding to word boundaries, generation of fixed-size representations of the segments, and decoding of the segments into word sequences may be performed at the user device. As a further example, another device and/or other type of system component(s) may (re) score the hypotheses to generate a N-best list of ASR hypotheses for the entire utterance. Additionally, the other system component(s) may perform further processing, such as NLU processing, skill selection, determination of output responsive to the utterance, etc.

The teachings of the present disclosure may provide, among other things, a more efficient speech processing system that uses less computing resources (e.g., memory, processor time, etc.), can execute on devices with limited resources, and provides accurate speech recognition results.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1A is a conceptual diagram illustrating a system 100, where a user device 110 performs ASR processing, according to embodiments of the present disclosure. As shown in FIG. 1A, the system 100 may include a user device 110, local to a user 105, in communication with one or more system components 120 via one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The user 105 may speak an input, and the user device 110 may capture audio 107, representing the spoken input, using one or more microphones of the user device 110. For example, the user 105 may say "What is the weather" or "Play music by [artist]." The user device 110 may determine audio data 108 corresponding to the audio 107, where the audio data 108 comprises one or more audio frames derived from the audio 107. The user device 110 may divide the audio 107 into a sequence of audio frames. The size of each audio frame may depend upon system configuration. In one example, each audio frame may include twenty-five (25) milliseconds of the audio 107. In another example, each audio frame may include twenty-five (25) milliseconds of the audio 107, with an overlap of the next audio frame of 10 milliseconds of the audio 107, thus resulting in sliding window processing of the audio 107. In an example embodiment, first audio data 108a includes a first set of audio frames (e.g., a first vector of audio frames), second audio data 108b includes a second set of audio frames, and so on. The audio data 108 may be determined as the audio 107 is captured by the user device 110 (e.g., in a streaming manner). The user device 110 may begin processing the audio data 108 as it becomes available, rather than waiting to begin processing until the user 105 has spoken the entire input/utterance.

As shown in FIG. 1A, the user device 110 may include an ASR component 150, which may include an audio encoder 152, an audio segmenter 154, a segment aggregator 156, and a label decoder 160. Details of these components are described below and later in relation to FIG. 1B.

The user device 110 may send (step 1) the audio data 108 to the audio encoder 152 for processing. The audio encoder 152 may be a machine learning model. In some embodiments, the audio encoder 152 may include one or more neural network layers. In an example embodiment, the audio encoder 152 may be a stack of self-attention transformer layers. The audio encoder 152 may process the first audio data 108a, including a set of audio frames/a portion of the audio 107, to determine first encoded audio data corresponding to the set of audio frames. As the second audio data 108b becomes available, the audio encoder 152 may process it to determine second encoded audio data, and so on.

The audio encoder 152 may send (step 2) the encoded audio data to the audio segmenter 154. The audio segmenter 154 may be a machine learning model-based segmenter configured to divide encoded audio data (or audio data 108 in some embodiments) into chunks corresponding to word boundaries (e.g., 0.5 seconds to 2 seconds chunks depending on the words represented in the encoded audio data). In an example embodiment, the audio segmenter 154 may be a neural network that predicts a label for individual audio frames represented in the encoded audio data, where the labels may correspond to beginning of segment, middle of segment, end of segment, or out-of-segment (e.g., non-speech audio). Based on the labels for consecutive audio frames, the audio segmenter 154 may determine a portion of the encoded audio data that corresponds to an individual audio segment. An individual audio segment may correspond to one word or more than one word (depending on the length of the words). An audio segment may include a portion of the encoded audio data from the audio encoder 152.

The audio segmenter 154 may send (step 3) the audio segments to the segment aggregator 156. In some embodiments, the segment aggregator is a machine learning model, and may include one or more neural network layers. The segment aggregator 156 may be configured to determine a fixed-size representation (e.g., a fixed-size vector, a fixed-size embedding, etc.) corresponding to an audio segment. The audio segments (determined by the audio segmenter 154) may be of different sizes (i.e., include different amounts of encoded audio data) based on the length of the word(s) represented in the audio segment. The segment aggregator 156 converts the different size audio segments into fixed-size representations, which can enable storage and processing by the user device 110.

The segment aggregator 156 may send (step 4) the fixed-size representations to the label decoder 160. In some embodiments, the label decoder 160 is a machine learning model. In an example embodiment, the label decoder 160 includes one or more neural network layers. In an example embodiment, the label decoder 160 includes at least one recurrent neural network layer. The label decoder 160 is configured to process a fixed-size representation of an individual audio segment and generate word labels for the audio segment. The label decoder 160 may generate more than one word label (i.e., multiple word hypotheses/predictions) for an audio segment. Also, an individual word label may represent multiple words when the fixed-sized representation corresponds to multiple words. In some embodiments, the label decoder 160 processes individual fixed-size representations at a time, and generates the labels within that fixed-size representation. Thus, the label decoder 160 decodes each fixed-size representation independently. The label decoder 160 may also generate a confidence score associated with a word label, which may represent a probability/likelihood of the word label corresponding to the fixed-size representation. The generated word labels may be outputted in the form of a confusion network.

The label decoder 160 may output (step 5) confusion network data 162, which may include multiple word labels/hypotheses (and corresponding confidence scores) per fixed-size representation. The confusion network data 162 may include groups of word labels associated with an individual fixed-size representation. In some embodiments, the confusion network data 162 may be represented in a table format, where a column (or a row) may correspond to a fixed-size representation, and the respective rows (or columns) may correspond to the word labels for that fixed-size representation.

The user device 110 may send (step 6) the confusion network data 162 to the system component(s) 120 for further processing. In some embodiments, the user device 110 may send the confusion network data 162 after word labels for all the fixed-size representations of the audio 107/the spoken input are generated. In other embodiments, the user device 110 may send the confusion network data 162 as it is generated by the label decoder 160.

The system component(s) 120 may include an ASR scoring component 170 (or an ASR rescoring component) that processes the confusion network data 162 to determine one or more ASR hypotheses corresponding to the spoken input. The ASR scoring component 170 may be configured to use one or more rescoring techniques that enables generation of a hypothesis corresponding to the entire spoken input. In some embodiments, the ASR scoring component 170 may select, from the confusion network data 162, the word label with the highest (or lowest depending on system configuration) confidence score for an individual audio segment, and include it in an ASR hypothesis. The ASR rescoring component 170 may select the next highest (or lowest) word label for an individual audio segment and include it in another ASR hypothesis for the spoken input. In this manner, the ASR rescoring component may generate a N-best list of ASR hypotheses for the spoken input. In another embodiment, the ASR rescoring component 170 may select, for an individual audio segment, the word label associated with a confidence score that satisfies a condition (e.g., a threshold confidence score). The ASR rescoring component 170 may generate multiple ASR hypotheses including a combination of word labels that each satisfy a condition (e.g., a threshold confidence score).

To determine a confidence score for the ASR hypothesis, the ASR rescoring component 170 may use the confidence scores for the word labels included in the confusion network data 162. For example, the ASR hypothesis's confidence score may be a sum, an average, a mean, a median, etc. of the word labels' confidence scores in the confusion network data 162.

In other embodiments, the ASR rescoring component 170 may employ a model (e.g., a statistical model, a machine learning model, etc.) to determine one or more ASR hypotheses and corresponding confidence scores from the confusion network data 162. In yet other embodiments, the ASR rescoring component 170 may employ other techniques.

The ASR rescoring component 170 may generate (step 7) ASR output data 172, which may include one or more ASR hypotheses, where the individual ASR hypotheses may include word representation data (e.g., text data, token data, etc.) representing words determined to be in the utterance, and a corresponding confidence score. The ASR output data 172 may be a N-best list of ASR hypotheses for the audio 107/spoken input. The system component(s) 120 may further process the ASR output data 172 as described below in connection with FIG. 3.

The user device 110 may include other components and may perform other processing described below in connection with FIGS. 3 and 4.

In some embodiments, the system component(s) 120 may be included in another device, for example, another user device 110, which may perform one or more of the functionalities described herein with respect to the system component(s) 120. In such embodiments, the other user device 110 may be accessible via a private network (e.g., a home's Wi-Fi network) in addition to a larger system located over a publicly accessible network (e.g., Internet, VPN, etc.). For example, referring to FIG. 1A, a first user device 110a (e.g., earbuds) may include the ASR component 150 (or portions of the ASR component 150), and may receive and process the audio 107 using the ASR component 150. The first user device 110a may then send the confusion network data 162 to a second user device 110b (e.g., a smartphone, a speech controllable device, a tablet, a laptop, etc.) for further processing as described herein.

Figure 1B:
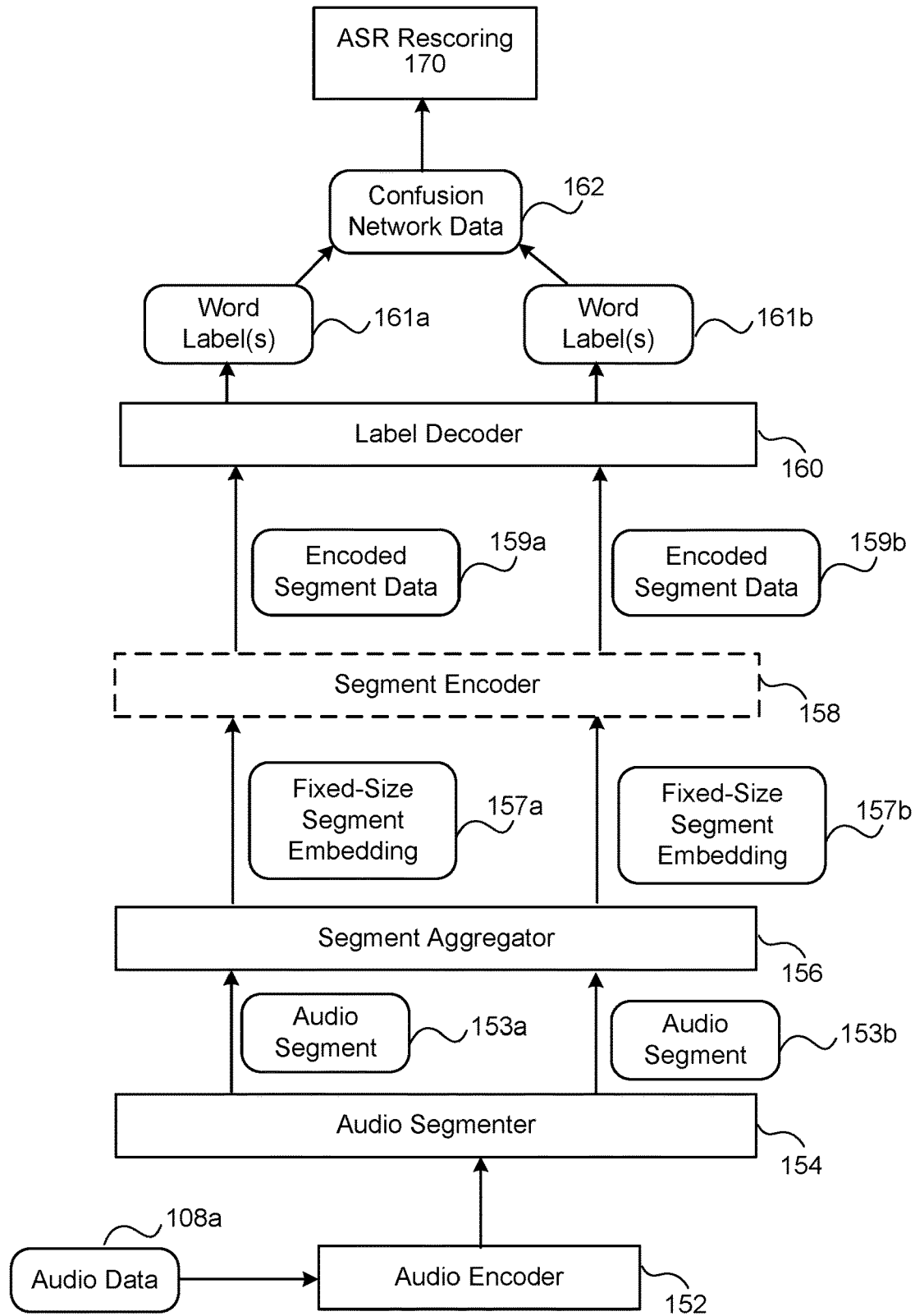
FIG. 1B is a conceptual diagram illustrating example components for ASR processing, according to embodiments of the present disclosure.

Some embodiments may involve use of other components for ASR processing. Such components are illustrated in FIG. 1B. Some of the components shown in FIG. 1B may be included in the ASR component 150 on the user device 110, and the other components may be included on the system component(s) 120. In some embodiments, the user device 110 may include the audio encoder 152, the audio segmenter 154, the segment aggregator 156, an optional segment encoder 158, and the label decoder 160, while the system component(s) 120 may include the ASR rescoring component 170. In such embodiments, the user device 110 may send the confusion network data 162 to the system component(s) 120.

In other embodiments, the user device 110 may include the audio encoder 152, the audio segmenter 154, the segment aggregator 156, and the optional segment encoder 158, while the system component(s) 120 may include the label decoder 160 and the ASR rescoring component 170. In such embodiments, the user device 110 may send the fixed-sized segment embedding 157 or the encoded segment data 159 (when the optional segment encoder 158 is included) to the system component(s) 120.

As described above, the audio encoder 152 may process the first audio data 108a containing a first set of audio frames, where the first audio data 108a may correspond to a particular time frame/time period t. The audio encoder 152 may generate first encoded audio data, which may be an output of a hidden layer or a hidden representation (ha) of the first audio data 108a corresponding to the time period t. While processing the second audio data 108b including a second set of audio frames, the audio encoder 152 may determine second encoded audio data, and so on.

The audio segmenter 154 may be configured to predict word boundaries from the encoded audio data and divide the encoded audio data into audio segments 153 corresponding to word boundaries. For example, the audio segmenter 154 may output a first audio segment 153a corresponding to one or more first words represented in the spoken input, a second audio segment 153b corresponding to one or more second words represented in the spoken input, and so on. In some embodiments, the audio segmenter 154 may output a binary boundary prediction (e.g., yes word is included, no word is not included) for each audio frame. In some cases, the first audio segment 153a may correspond to a word(s) preceding the word(s) corresponding to the second audio segment 153b.

In some embodiments, the audio segmenter 154 may group some of the word boundaries depending on the length of the words and/or the confidence of the boundary prediction. In some cases it may be difficult to detect a boundary for separate words because they may be spoken fluidly or fluently. In such cases, the words may be grouped together into one audio segment 153 based on the amount of pause between the words. For example, the words "in the" or "are you" may be grouped into one audio segment 153. If a word is spoken with a considerable amount of pause before and after it, then that word may correspond to an individual audio segment 153. In some embodiments, an audio segment 153 may be approximately 0.5 seconds (which may represent two words) to 2 seconds long. The audio segmenter 154 may be trained jointly, with one or more other components shown in FIG. 1A or 1B, and using word boundary annotations in the training data.

The segment aggregator 156 may compute a fixed-size segment embedding 157 corresponding to the audio segment 153. In some embodiments, the segment aggregator 156 may use a mean-over-time within the audio segment 153 to determine the fixed-size segment embedding 157. The segment aggregator 156 may determine a first fixed-size segment embedding 157a corresponding to the first audio segment 153a, a second fixed-size segment embedding 157b corresponding to the second audio segment 153b, and so on. In other embodiments, the segment aggregator 156 may use a machine learning model, such as a RNN, a self-attention model, etc. to determine the fixed-size segment embedding 157. One of the reasons for using the segment aggregator 156 is to generate an amount of data (e.g., embedding 157) that is relatively small. Such an amount of data may be communicated from the user device 110 to the system component(s) 120 using relatively less resources than communicating the audio data 108. Additionally, the fixed-size segment embedding 157 may not be used to reconstruct the audio data 108 or the audio 107, thus, the user's speech is not identifiable by the system component(s) 120. Furthermore, because of the small amount of data being communicated, a third party, such as an unauthorized device, may not be able to readily recognize that audio data is being transmitted.

Some embodiments may also include a segment encoder 158 as shown in FIG. 1B. The segment encoder 158 is an optional component that processes the fixed-size segment embedding 157 to generate encoded segment data 159, which is also of fixed-size (e.g., the same size as the fixed size segment embedding 157). In some embodiments, the segment encoder 158 may be an RNN model that also considers previous encoded segment data 159 corresponding to previous audio segments of the instant spoken input. For example, in generating second encoded segment data 159b corresponding to the second fixed-size segment embedding 157b, the segment encoder 158 may also process first encoded segment data 159a corresponding to the first fixed-size segment embedding 157a. One of the benefits of considering the previous audio segment is that it allows introduction of long distance/memory dependencies in a way that is more efficient than a recurrent memory through an audio encoder because there are many more audio frames for processing than audio segments.

In some embodiments, the segment encoder 158 may process the immediately previously generated encoded segment data 159 (corresponding to an immediately previous audio segment). In other embodiments, the segment encoder 158 may process all encoded segment data 159 previously generated for the spoken input. In the case that the segment encoder 158 is a type of recurrent network, then it may take as input the fixed size segment embedding 157 of the immediately previous audio segment 153, and because of the recurrent network's internal state (while processing the instant spoken input), memory of all the previous audio segments 153 is also available and may be used in determining the encoded segment data 159 for an instant audio segment 153. In other embodiments, the segment encoder 158 may be a transformer model that takes all previous audio segments 153 as inputs directly.

In some embodiments, the label decoder 160 may process the encoded segment data 159 to generate variable length word sequences. In other embodiments, the label decoder 160 may process the fixed-size segment embedding 157 to generate the word sequences. The label decoder 160 may be an auto-regressive model that generates sequences of word labels 161 represented in the audio segment 153. In some embodiments, the label decoder 160 may generate sub-word labels or phoneme labels. The label decoder 160 may be a neural network model, such as a RNN, and may apply attention to the fixed-size segment embedding 157 or the encoded segment data 159 (whichever is applicable). The label decoder 160 may be configured to use special input symbols for start-of-segment and special output symbols for end-of-segment. Additionally, start-of-sentence and end-of-sentence symbols may be used to indicate the start and end of a sentence (within a spoken input). The label decoder 160 may have access to the instant audio segment data 153, and the word label(s) 161 may be generated from that instant audio segment 153. Thus, each audio segment 153 may be decoded independently. For example, the word label(s) 161a may be generated for the audio segment 153a, the word label(s) 161b may be generated for the audio segment 153b, and so on. As described above, the label decoder 160 may determine multiple word labels, representing different word predictions/hypotheses, for an individual audio segment 153. As such, the word label(s) 161*a* may include multiple word predictions, each associated with a corresponding confidence score, for the audio segment 153*a*.

The individual word labels 161 may be generated based on processing the audio segments 153 in a sequential manner. For example, the system components may, at a first time, process the first audio segment 153*a* to generate the word label(s) 161*a*, and then at a second time (after the first time), process the second audio segment 153*b* to generate the word label(s) 161*b*.

In some embodiments, the label decoder 160 can decode audio segments concurrently or in parallel. For example, the system may include multiple label decoders 160 running in parallel, processing separate audio segments of a spoken input, and generating word hypotheses for the individual audio segments in parallel. Such embodiments may be used when audio data for an entire utterance is available, for example, when processing previously received and stored spoken inputs, in offline operations, for training purposes, etc.

The word label(s) 161 may be included in the confusion network data 162. The confusion network data 162 may include groupings of word labels (which may be represented as a table column, a table row, a bin, a bucket, etc.) associated with individual audio segments. In some embodiments, the system may be configured to retain/maintain a defined number of word predictions per audio segment 153. In such embodiments, the word predictions over the defined number may be pruned/discarded based on, for example, their corresponding confidence scores. The ASR rescoring component 170 may select one word prediction, per audio segment 153, to generate a full ASR hypothesis for the entire spoken input.

One of the benefits of using a confusion network for the word labels is that the system is capable of maintaining more word predictions than other systems, and the word predictions are not pruned too early in the processing operations, thus reducing the chance of eliminating a correct word prediction and of generating an erroneous ASR transcription.

The techniques described in relation to FIGS. 1A and 1B, which generate word predictions on a per audio segment-basis, are also computationally less expensive than other systems that produce word hypotheses on a per frame-basis. The number of frames within audio data containing speech is higher than the number of word segments/boundaries determined by the audio segmenter 154. The compute cost of the label decoder 160 depends on the number of words hypotheses generated, and not on the number of audio frames.

The components shown in FIG. 1B can be used to generate dense confusion networks that include a large number of word hypotheses as compared to other systems, and using approximately the same number of decoder calls as other systems.

In some embodiments, the label decoder 160 may be configured to generate a sequence of phonemes represented in the audio segments 153. The phoneme labels may be aligned with audio frames of the audio data 108. Such phoneme labels may be used by other components for further processing. For example, entity resolution processing, which may be performed by a NLU component and/or a skill component, may use phoneme labels to disambiguate entities (e.g., similar sounding entities) represented in the spoken input. As another example, a skill component configured to output user requested "announcements" (e.g., the user 105 says "Alexa, announce dinner is ready") or other messages (e.g., "Alexa, send a message to John that dinner is ready") may use phoneme labels and phoneme-audio frame alignment to identify the portion of the spoken input representing the announcement or message to be replayed/sent. As yet another example, a skill component configured to teach a user reading skills may use the phoneme labels. For example, when the user mispronounces a word, the skill component can use the phoneme labels to teach the user the correct pronunciation.

One or more of the components shown in FIG. 1B may be trained/configured together. The training data may include separate labels/annotations for the different components. For example, the training data (which may be audio data containing speech) may include annotations for words that may be used for training the audio segmenter 154 and/or the label decoder 160. When transcriptions for audio are available, the transcription may be aligned with the respective audio to indicate word boundaries for the audio segmenter 154. The other components may be trained end-to-end to optimize the prediction on the word labels. In some embodiments, the audio segmenter 154 may be pre-trained or trained separately, then plugged-in to perform end-to-end training of the components shown in FIG. 1B. The system may be a multi-task system, where one objective is to improve the accuracy of the audio segmenter 154, and another is to improve the prediction from the label decoder 160. As compared to a RNN-T model, the components shown in FIG. 1B can be trained using a single cross-entropy objective, which may reduce the resources (e.g., time, processors, memory, iterations, etc.) needed for training.

FIG. 2 illustrates example confusion network data that may be used to determine ASR output data, according to embodiments of the present disclosure. As shown in FIG. 2, multiple word hypotheses are determined for individual audio segments. Word labels 210 represent word hypotheses for a first audio segment, word labels 220 represent word hypotheses for a second audio segment, word labels 230 represent word hypotheses for a third audio segment, and word labels 240 represent word hypotheses for a fourth audio segment. Individual word hypotheses can include or be associated with a corresponding score (shown as [score]). It will be appreciated that a spoken input is not limited to the number of audio segments illustrated in FIG. 2.

Figure 3:
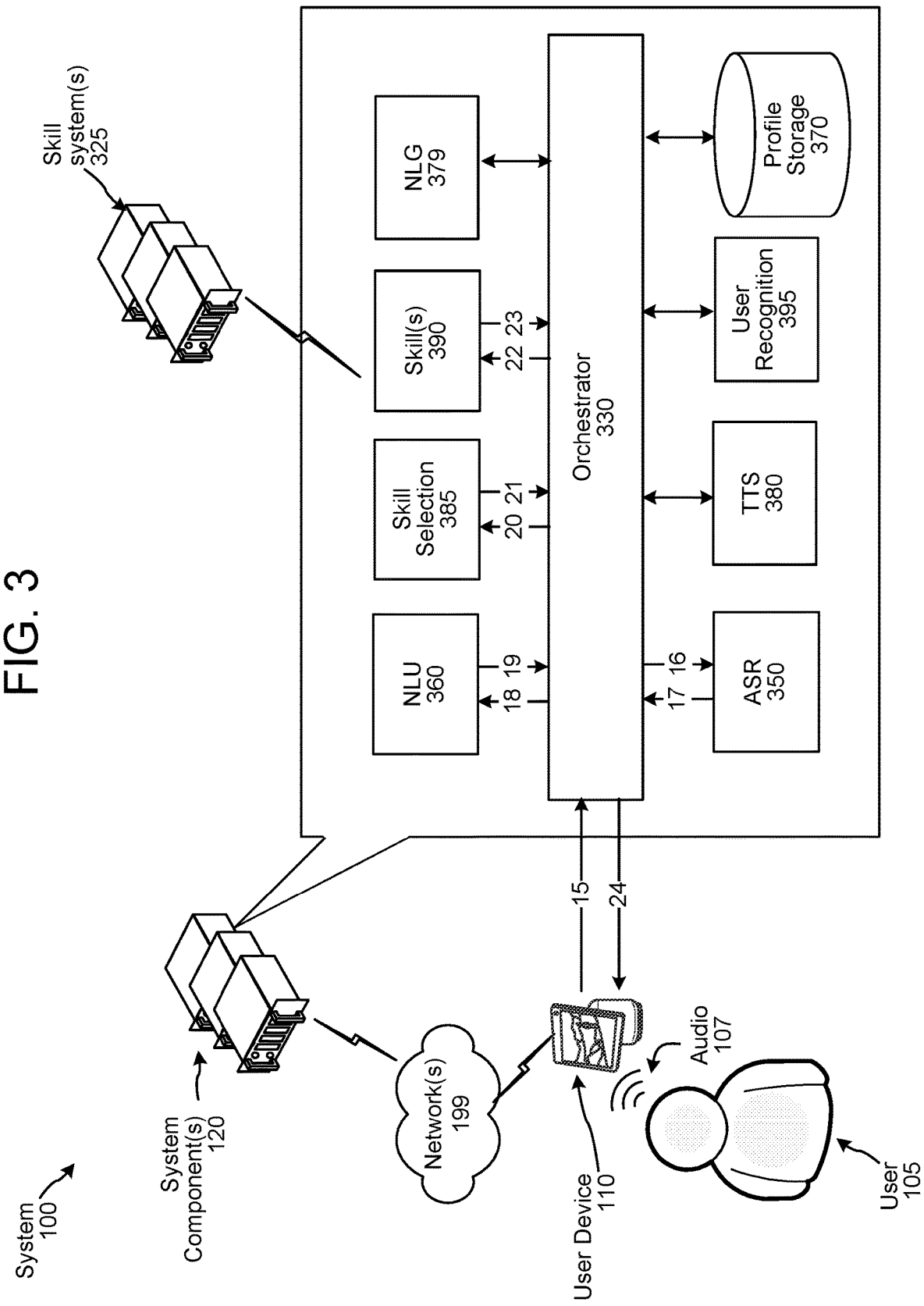
FIG. 3 is a conceptual diagram illustrating system components, according to embodiments of the present disclosure.
Figure 4:
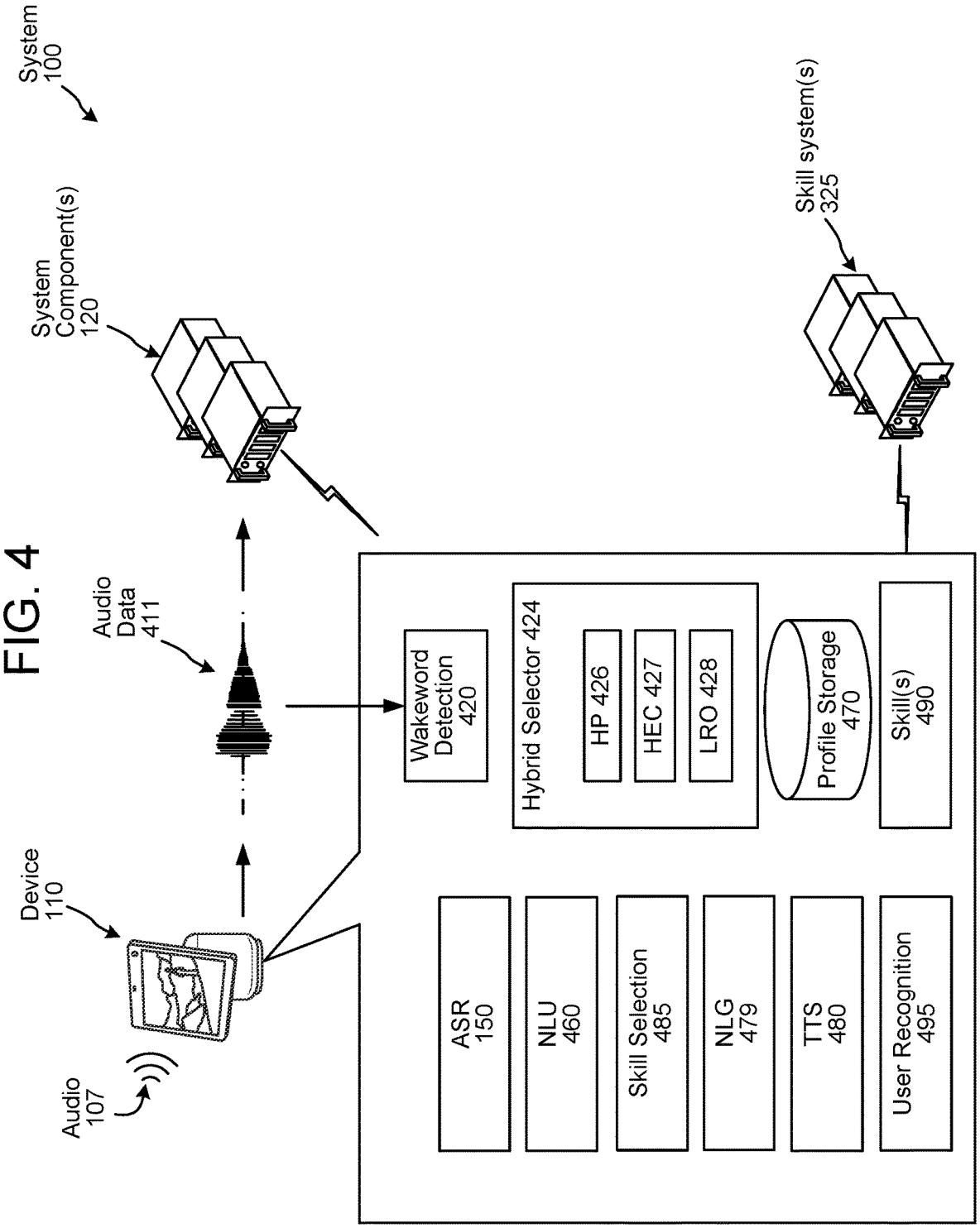
FIG. 4 is a conceptual diagram illustrating components that may be included in a device, according to embodiments of the present disclosure.

The system component(s) 120 may operate using various components as illustrated in FIG. 3 to process user inputs received from the user 105. The various components may be located on a same or different physical devices. Communication between various components may occur directly or across a network(s) 199.

A microphone or array of microphones (of or otherwise associated with the user device 110) may capture audio 107 from the user 105. The user device 110 processes audio data representing the audio 107, to determine whether speech is detected. The user device 110 may use various techniques to determine whether audio data includes speech. In some examples, the user device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the user device 110 may determine if the speech is directed at the user device 110/system component(s) 120. In at least some embodiments, such determination may be made using the wakeword detection component 420 (shown in FIG. 4). The wakeword detection component 420 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 420 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. In various embodiments, the user device 110 may behave differently depending on which wakeword is used. For example, in a multi-user environment, different users may use different wakewords, and the user device 110 may tailor its operation in response to a particular user/wakeword matching. The user device 110 may, for example, access a user profile associated with a particular wakeword and load device preferences or device usage history stored in the user profile. In other embodiments, a first wakeword may be associated with a first mode of operation of the user device 110 and a second wakeword may be associated with a second mode of operation of the user device 110. The first mode of operation may be, for example, a personal assistant, and the second mode of operation may be navigation (such as automobile navigation).

In another example, the user device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the user device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 420 detects a wakeword, the user device 110 may "wake" and begin processing the audio data 108, corresponding to the audio 107, using the ASR component 150 and/or other components included in the user device 110. The user device 110 may additionally or alternatively begin transmitting the audio data 108 to the system component(s) 120 when a wakeword is detected. The audio data 108 may include the detected wakeword, or the user device 110 may remove the portion of the audio data, corresponding to the detected wakeword, prior to sending the audio data to the system component(s) 120 and/or other components of the user device 110.

As described herein, the ASR component 150 of the user device 110 may process the audio data 108, and may determine and send (step 15) data, such as the fixed-size segment embedding 157 or an encoded version of the fixed-size segment embedding 157, to the system component(s) 120 for further processing (as described in connection to FIGS. 1A and 1B).

The orchestrator component 330 may receive the data from the user device 110. The orchestrator component 330 may send (step 16) the data to an ASR component 350. The ASR component 350, in some embodiments, may include the ASR rescoring component 170. In some embodiments, the ASR component 350 may also include the label decoder 160, as described in relation to FIG. 1B. The ASR component 350 may process the data, from the ASR component 150 and as described in relation to FIGS. 1A and 1B, to determine the ASR output data 172 including one or more ASR hypotheses (e.g., token data, natural language text data, etc.) corresponding to the words spoken by the user 105.

In other embodiments, the ASR component 350 may process the audio data 108 to determine ASR output data including one or more ASR hypotheses corresponding to the words included in the spoken user input. An ASR hypothesis may be configured as a textual (or data) interpretation of the words, or may be configured in another manner, such as one or more tokens. Each ASR hypothesis may represent a different likely interpretation of the words spoken in the input audio data. Each ASR hypothesis may be associated with a score representing a confidence of ASR processing performed to determine the ASR hypothesis with which the score is associated. The ASR component 350 may interpret the speech in the input audio data based on a similarity between the audio data and pre-established language models. For example, the ASR component 350 may compare the input audio data with models for sounds (e.g., subword units, such as phonemes, etc.) and sequences of sounds to identify words that match the sequence of sounds of the speech represented in the input audio data. In another example embodiment, the ASR component 350 may include a machine learning model, such as a recurrent neural network transducer (RNN-T) model, that processes the audio data 108 to generate the ASR output data.

The ASR component 350 may send (step 17) the ASR output data to the orchestrator component 330. The orchestrator component 330 may send (step 18) the ASR output data to a NLU component 360.

In other examples, the user 105 may provide another type of input other than a spoken input. For example, the user 105 may select a button, select a displayed graphical interface element, perform a gesture (e.g., a hand gesture, facial expression, head movement, etc.), enter text or other data, etc. In such cases, the user device 110 may send (step 15) other type of input data, such as, image data corresponding to a gesture, text data corresponding to a selected button, a graphical user interface element, entered text, etc., corresponding to the user input to the system component(s) 120 for processing. The orchestrator component 330 may send the other type of input data to the NLU component 360 or another component for further processing.

The NLU component 360 may be configured to determine an intent corresponding to the user input. The NLU component 360 may include an intent classification (IC) component. In some embodiments, the NLU component 360 may include multiple IC components, where some of the IC components may correspond to different domains. For example, some IC components may correspond to a first domain (e.g., a shopping domain) and may determine intents (e.g., purchase intent, add to cart intent, add to list intent, etc.) that are associated with the first domain. As another example, other IC components may correspond to a second domain (e.g., a music domain) and may determine intents (e.g., add to playlist intent, play song intent, play music video intent, etc.) that are associated with the second domain, etc.

The NLU component 360 may determine an intent corresponding to the user input. An intent corresponds to an action responsive to the user input. To perform intent classification processing, the NLU component 360 may communicate with a database of words linked to intents. For example, a music intent database may link words and phrases such as "quiet," "volume off," and "mute" to a <Mute> intent. The NLU component 360 identifies intents by comparing words and phrases in the ASR output data to the words and phrases in an intents database. In some embodiments, the NLU component 360 may communicate with multiple intents databases, with each intents database corresponding to one or more intents associated with a particular skill component.

For example, processing of ASR output data corresponding to an example user input "play my workout playlist" may determine an intent of <PlayMusic>. For further example, processing of ASR output data corresponding to an example user input "call mom" may determine an intent of <Call>. In another example, processing of ASR output data corresponding to the user input "call mom using video" may determine an intent of <VideoCall>. In yet another example, processing of ASR output data corresponding to an example user input "what is today's weather" may determine an intent of <OutputWeather>.

The NLU component 360 may also be configured to determine one or more entity types and entities corresponding to the user input. The NLU component 360 may include a Named Entity Recognizer (NER) component. In some embodiments, the NLU component 360 may include multiple NER components, where some of the NER components may correspond to different domains. For example, some NER components may correspond to a first domain (e.g., a shopping domain) and may determine entity types and entities (e.g., item name, price, quantity, etc.) that are associated with the first domain. As another example, other NER component may correspond to a second domain (e.g., a music domain) and may determine entity types and entities (e.g., song name, artist name, album name, etc.) that are associated with the second domain, etc.

The NLU component 360 may also perform Named Entity Recognition (NER) processing on the ASR output data to determine one or more portions, sometimes referred to as slots, of the user input that may be needed for post-NLU processing, for example, processing performed by a skill component. For example, processing of ASR output data corresponding to an example user input "play [song name]" may determine an entity type of "SongName" and an entity value corresponding to the indicated song name. For further example, processing of ASR output data corresponding to an example user input "call mom" may determine an entity type of "Recipient" and an entity value corresponding to "mom." In another example, processing of ASR output data corresponding to an example user input "what is today's weather" may determine an entity type of "Date" and an entity value of "today."

In some embodiments, an intent may be linked to one or more entity types to be populated with entity values. For example, a <PlayMusic> intent may be associated with an "artist name" entity type, an "album name" entity type, and/or a "song name" entity type.

For example, the NLU component 360 may perform NER processing to identify words in ASR output data as subject, object, verb, preposition, etc. based on grammar rules and/or models. Then, the NLU component 360 may perform IC processing using the identified verb to identify an intent. Thereafter, the NLU component 360 may again perform NER processing to determine the entity type(s) associated with the identified intent. For example, a model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

The NLU component 360 may perform semantic tagging, which is the labeling of a word or combination of words according to their type/semantic meaning. The NLU component 360 may include parsing ASR output data using heuristic grammar rules, or a model may be constructed using techniques such as hidden Markov models, maximum entropy models, log linear models, conditional random fields (CRFs), and the like. For example, NER processing with respect to a music skill component may include parsing and tagging ASR output data corresponding to "play mother's little helper by the rolling stones" as {Verb}: "Play," {Object}: "mother's little helper," {Object Preposition}: "by," and {Object Modifier}: "the rolling stones." NER processing may identify "Play" as a verb based on a word database associated with the music skill component, which the NLU component 360 determines corresponds to a <PlayMusic> intent.

The NLU component 360 may also perform domain classification (DC) processing to determine a domain corresponding to the user input. As defined herein above, a "domain" may refer to a collection of related functionality. A domain may be associated with one or more skill components performing related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

The NLU component 360 may determine NLU output data including one or more NLU hypotheses, where each NLU hypothesis may include a domain, an intent, one or more entity types and one or more corresponding entities (if appropriate for the user input), and a confidence score for the NLU hypothesis. The NLU component 360 may send (step 19) the NLU output data to the orchestrator component 330, which may send (step 20) the NLU output data to the skill selection component 385.

The skill selection component 385 may process the NLU output data, and optionally other data, to determine one or more skill components 390 that may be capable of performing an action responsive to the user input. The skill selection component 385 is configured to determine a skill component, or n-best list of skill components each associated with a confidence score/value, to execute to respond to the user input. The skill selection component 385 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the user device 110 to output content, e.g., music, video, synthesized speech, etc., when the user device 110 captured the user input, one or more skill components that are indicated as enabled in a profile (as stored in the profile storage 370) associated with the user 105, output capabilities of the user device 110, a geographic location of the user device 110, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule, e.g., each rule corresponding to a different intent capable of being handled by the skill component. In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary, e.g., yes/no, true/false, etc., determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components, e.g., only skill components indicated as enabled in the user profile of the user 105.

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of respond to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 385. For example, such other data may indicate capabilities, e.g., output capabilities or components such as a connected screen, loudspeaker, etc., of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 105 already has a profile and/or subscription with the skill component; that the user 105 does not have a subscription with the skill component, but that there is a free trial/tier the skill component is offering; with respect to a taxi skill component, a cost of a trip based on start and end locations, how long the user 105 would have to wait to be picked up, etc.; and/or other data available to the skill component that is related to the skill component's processing of the user input. In some embodiments, a skill component's pre-response may include an indicator, e.g., flag, representing a strength of the skill component's ability to personalize its response to the user input.

In some embodiments, a skill component's pre-response may be configured to a pre-defined schema. By requiring pre-responses to conform to a specific schema, e.g., by requiring skill components to only be able to provide certain types of data in pre-responses, new skill components may be onboarded into the skill component selection functionality without needing to reconfigure the skill selection component 385 each time a new skill component is onboarded. Moreover, requiring pre-responses to conform to a schema limits the amount of values needed to be used to train and implement a ML model for ranking skill components.

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 105, e.g., as represented in a user profile or group profile stored in the profile storage 370, NLU confidence scores of the NLU output data, a device type of the user device 110, data indicating whether the user device 110 was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 105, that a NLU hypothesis corresponding to the skill component is associated with a NLU confidence score satisfying a condition, e.g., a threshold NLU confidence score, that the skill component was outputting content via the user device 110 when the user device 110 received the user input, etc. Things that may decrease a skill component's ranking include, for example, that the skill component is associated with a pre-response indicating the skill component cannot generate a response that is personalized to the user 105, that a NLU hypothesis corresponding to the skill component is associated with a NLU confidence score failing to satisfy a condition, e.g., a threshold NLU confidence score, etc.

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

The skill selection component 385 may send (step 21) a skill component identifier, or a n-best list of skill component identifiers, to the orchestrator component 330. The orchestrator component 330 may send (step 22), to a skill component 390 corresponding to the skill component identifier or best ranked skill component identifier from the n-best list, the NLU output data corresponding to the user input. The skill component 390 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the user device 110, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza.

A skill component may operate in conjunction with the user device 110/system component(s) 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The skill component 390 may process to determine output data responsive to the spoken user input, e.g., based on the intent and entity data as represented in the NLU output data received by the skill component 390. The skill component 390 may send (step 23) the output data to the orchestrator component 330. The orchestrator component 330 may send (step 24) the output data to the user device 110 to present to the user 105 in response to the user input received by the user device 110. The output data presented to the user 105 may be one or more of audio data (e.g., synthesized speech, music, etc.), video data (e.g., movie, video, etc.), text data, graphics, icons, images, etc.

A skill system(s) 325 may communicate with the skill component(s) 390 within the system component(s) 120 directly and/or via the orchestrator component 330. A skill system(s) 325 may be configured to perform one or more actions. A skill may enable a skill system(s) 325 to execute specific functionality in order to provide data or perform some other action requested by a user. For example, a weather service skill may enable a skill service(s) 325 to provide weather information to the system component(s) 120, a car service skill may enable a skill system(s) 325 to book a trip using a taxi or ride sharing service, an order pizza skill may enable a skill system(s) 325 to order a pizza using a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system component(s) 120 may include a skill component 390 dedicated to interacting with the skill system(s) 325. A skill, skill device, or skill component may include a skill component 390 operated by the system component(s) 120 and/or skill operated by the skill system(s) 325.

The system component(s) 120 may include a natural language generation (NLG) component 379. The NLG component 379 can generate text (or other forms of data, for example, token data, embeddings corresponding to natural language words, etc.) for purposes of TTS output to a user. For example the NLG component 379 may generate text and/or other data corresponding to instructions corresponding to a particular action for the user to perform. The NLG component 379 may generate appropriate text for various outputs as described herein. The NLG component 379 may include one or more trained models configured to output text appropriate for a particular input. The text output by the NLG component 379 may become input for the TTS component 380. Alternatively or in addition, the TTS component 380 may receive text data from a skill 390 or other system component for output.

The NLG component 379 may include a trained model. The NLG component 379 may generate text data such that the natural language output has a natural feel and, in some embodiments, includes words and/or phrases specifically formatted for a user. The NLG component 379 may use templates to formulate responses. The NLG component 379 may include models trained from the various templates for generating the output text data. For example, the NLG component 379 may analyze transcripts of local news programs, television shows, sporting events, or any other media program to obtain common components of a relevant language and/or region. As one illustrative example, the NLG component 379 may analyze a transcription of a regional sports program to determine commonly used words or phrases for describing scores or other sporting news for a particular region. The NLG component 379 may further receive, as inputs, a dialog history, an indicator of a level of formality, and/or a command history or other user history such as the dialog history.

The NLG component 379 may generate natural language output data based on one or more response templates. Further continuing the example above, the NLG component 379 may select a template in response to the question, "What is the weather currently like?" of the form: "The weather currently is $weather_information$." The NLG component 379 may analyze the logical form of the template to produce one or more textual responses including markups and annotations to familiarize the response that is generated. In some embodiments, the NLG component 379 may determine which response is the most appropriate response to be selected. The selection may, therefore, be based on past responses, past questions, a level of formality, and/or any other feature, or any other combination thereof. Responsive audio data representing the response/natural language output generated by the NLG component 379 may then be generated using the text-to-speech component 380. In other cases, the response/natural language output generated by the NLG component 379 may be displayed at the device 110 in text form and may be included in a notification, a display card, etc. and may be presented along with graphics, icons, images, audible outputs, etc.

The TTS component 380 is configured to generate output audio data including synthesized speech. The TTS component 380 may perform speech synthesis using one or more different methods. In one method of synthesis called unit selection, the TTS component 380 matches a database of recorded speech against the data input to the TTS component 380. The TTS component 380 matches the input data against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 380 may match units to the input data to create a natural sounding waveform. The unit database may include multiple examples of phonetic units to provide the TTS component 380 with many different options for concatenating units into speech. One benefit of unit selection is that, depending on the size of the database, a natural sounding speech output may be generated. The larger the unit database, the more likely the TTS component 380 will be able to construct natural sounding speech.

Unit selection speech synthesis may be performed as follows. Unit selection includes a two-step process. First the TTS component 380 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output, e.g., pitch, prosody, etc. A join cost represents how well a speech unit matches a consecutive speech unit for purposes of concatenating the speech units together in the eventual synthesized speech. The overall cost function is a combination of target cost, join cost, and other costs that may be determined by the TTS component 380. As part of unit selection, the speech unit with the lowest overall combined cost may be chosen. For example, a speech unit with a very low target cost may not necessarily be selected if its join cost is high.

In another method of synthesis called parametric synthesis, parameters such as frequency, volume, noise, etc. are varied by the TTS component 380 to create an artificial speech waveform output. Parametric synthesis may use an acoustic model and various statistical techniques to match data, input to the TTS component 380, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 380 may include an acoustic model, or other models, which may convert data, input to the TTS component 380, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 380 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder, i.e., a digital voice encoder, to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 380, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 380 may also calculate potential states for other potential audio outputs, such as various ways of pronouncing phoneme/E/, as potential acoustic matches for the phonetic unit. In this manner multiple states and state transition probabilities may be calculated.

The probable states and probable state transitions calculated by the TTS component 380 may lead to a number of potential audio output sequences. Based on the acoustic model and other potential models, the potential audio output sequences may be scored according to a confidence level of the TTS component 380. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

The system 100 (either on device 110, system components 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 370 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 370 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 370 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith.

That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 370 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The system component(s) 120 may include a user recognition component 395 that recognizes one or more users using a variety of data. However, the disclosure is not limited thereto, and the device 110 may include a user recognition component 495 instead of and/or in addition to user recognition component 395 of the system component(s) 120 without departing from the disclosure. User recognition component 495 operates similarly to user recognition component 395.

The user-recognition component 395 may take as input the audio data 108/411 and/or ASR data output by the ASR component 350. The user-recognition component 395 may perform user recognition by comparing audio characteristics in the audio data 108/411 to stored audio characteristics of users. The user-recognition component 395 may also perform user recognition by comparing biometric data (e.g., fingerprint data, iris data, etc.), received by the system in correlation with the present user input, to stored biometric data of users assuming user permission and previous authorization. The user-recognition component 395 may further perform user recognition by comparing image data (e.g., including a representation of at least a feature of a user), received by the system in correlation with the present user input, with stored image data including representations of features of different users. The user-recognition component 395 may perform additional user recognition processes, including those known in the art.

The user-recognition component 395 determines scores indicating whether user input originated from a particular user. For example, a first score may indicate a likelihood that the user input originated from a first user, a second score may indicate a likelihood that the user input originated from a second user, etc. The user-recognition component 395 also determines an overall confidence regarding the accuracy of user recognition operations.

Output of the user-recognition component 395 may include a single user identifier corresponding to the most likely user that originated the user input. Alternatively, output of the user-recognition component 395 may include an N-best list of user identifiers with respective scores indicating likelihoods of respective users originating the user input. The output of the user-recognition component 395 may be used to inform NLU processing as well as processing performed by other components of the system.

As described above, speech processing may be performed using two different components, i.e., the ASR component 150/350 and the NLU component 360. In some embodiments, a spoken language understanding (SLU) component may be configured to process audio data to determine NLU output data. The SLU component may be equivalent to a combination of the ASR component 150/350 and the NLU component 360. Yet, the SLU component may process audio data and directly determine the NLU output data, without an intermediate step of generating ASR output data. As such, the SLU component may take audio data representing speech and attempt to make a semantic interpretation of the speech. The SLU component may output NLU output data including a most likely NLU hypothesis, or multiple NLU hypotheses associated with respective confidence or other scores (such as probability scores, etc.).

The foregoing describes illustrative components and processing of the system component(s) 120. The following describes illustrative components and processing of the user device 110. As illustrated in FIG. 4, in at least some embodiments the system component(s) 120 may receive audio data 411 from the user device 110, to recognize speech corresponding to a spoken natural language in the received audio data 411, and to perform functions in response to the recognized speech. In at least some embodiments, these functions involve sending directives (e.g., commands), from the system component(s) 120 to the user device 110 to cause the user device 110 to perform an action, such as output synthesized speech (responsive to the spoken natural language input) via a loudspeaker(s), and/or control one or more secondary devices by sending control commands to the one or more secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output synthesized speech via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It will be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The user device 110 may include a wakeword detection component 420 configured to detect a wakeword (e.g., "Alexa") that indicates to the user device 110 that the audio data 411 is to be processed for determining NLU output data. In at least some embodiments, a hybrid selector 424, of the user device 110, may send the audio data 411 to the wakeword detection component 420. If the wakeword detection component 420 detects a wakeword in the audio data 411, the wakeword detection component 420 may send an indication of such detection to the hybrid selector 424. In response to receiving the indication, the hybrid selector 424 may send the audio data 411 to the system component(s) 120 and/or an on-device ASR component 150. The wakeword detection component 420 may also send an indication, to the hybrid selector 424, representing a wakeword was not detected. In response to receiving such an indication, the hybrid selector 424 may refrain from sending the audio data 411 to the system component(s) 120, and may prevent the on-device ASR component 150 from processing the audio data 411. In this situation, the audio data 411 can be discarded.

The user device 110 may conduct its own speech processing using on-device language processing components (an on-device ASR component 150, and/or an on-device NLU component 460) similar to the manner discussed above with respect to the speech processing system-implemented ASR component 150, and NLU component 360. The user device 110 may also internally include, or otherwise have access to, other components such as a skill selection component 485 (configured to process in a similar manner to the skill selection component 385), one or more skills 490 (configured to process in a similar manner to the skill component(s) 390), a user recognition component 495 (configured to process in a similar manner to the user recognition component 395), profile storage 470 (configured to store similar profile data to the profile storage 370), a NLG component 479 (configured to process in a similar manner as the NLG component 379), a TTS component 480 (configured to process in a similar manner as the TTS component 380), and other components. In at least some embodiments, the on-device profile storage 470 may only store profile data for a user or group of users specifically associated with the user device 110.

In at least some embodiments, the on-device language processing components may not have the same capabilities as the language processing components implemented by the system component(s) 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system component(s) 120. If the user device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system component(s) 120.

The hybrid selector 424, of the user device 110, may include a hybrid proxy (HP) 426 configured to proxy traffic to/from the system component(s) 120. For example, the HP 426 may be configured to send messages to/from a hybrid execution controller (HEC) 427 of the hybrid selector 424. For example, command/directive data received from the system component(s) 120 can be sent to the HEC 427 using the HP 426. The HP 426 may also be configured to allow the audio data 411 to pass to the system component(s) 120 while also receiving (e.g., intercepting) this audio data 411 and sending the audio data 411 to the HEC 427.

In at least some embodiments, the hybrid selector 424 may further include a local request orchestrator (LRO) 428 configured to notify the on-device ASR component 150 about the availability of the audio data 411, and to otherwise initiate the operations of on-device language processing when the audio data 411 becomes available. In general, the hybrid selector 424 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 411 is received, the HP 426 may allow the audio data 411 to pass through to the system component(s) 120 and the HP 426 may also input the audio data 411 to the on-device ASR component 150 by routing the audio data 411 through the HEC 427 of the hybrid selector 424, whereby the LRO 428 notifies the on-device ASR component 150 of the audio data 411. At this point, the hybrid selector 424 may wait for response data from either or both the system component(s) 120 and/or the on-device language processing components. However, the disclosure is not limited thereto, and in some examples the hybrid selector 424 may send the audio data 411 only to the on-device ASR component 150 without departing from the disclosure. For example, the user device 110 may process the audio data 411 on-device without sending the audio data 411 to the system component(s) 120.

The on-device ASR component 150 is configured to receive the audio data 411 from the hybrid selector 424, and to recognize speech in the audio data 411, and the on-device NLU component 460 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 460) may be selected as usable to respond to a natural language input, and local response data may be sent (e.g., local NLU output data, local knowledge base information, internet search results, and/or local directive data) to the hybrid selector 424, such as a "ReadyToExecute" response. The hybrid selector 424 may then determine whether to use directive data from the on-device components to respond to the natural language input, to use directive data received from the system component(s) 120, assuming a remote response is even received (e.g., when the user device 110 is able to access the system component(s) 120 over the network(s) 199), or to determine output data requesting additional information from the user 105.

The user device 110 and/or the system component(s) 120 may associate a unique identifier with each natural language input. The user device 110 may include the unique identifier when sending the audio data 411 to the system component(s) 120, and the response data from the system component(s) 120 may include the unique identifier to identify to which natural language input the response data corresponds.

In at least some embodiments, the user device 110 may include one or more skill components 490. The skill component(s) 490 installed on (or in communication with) the user device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 5:
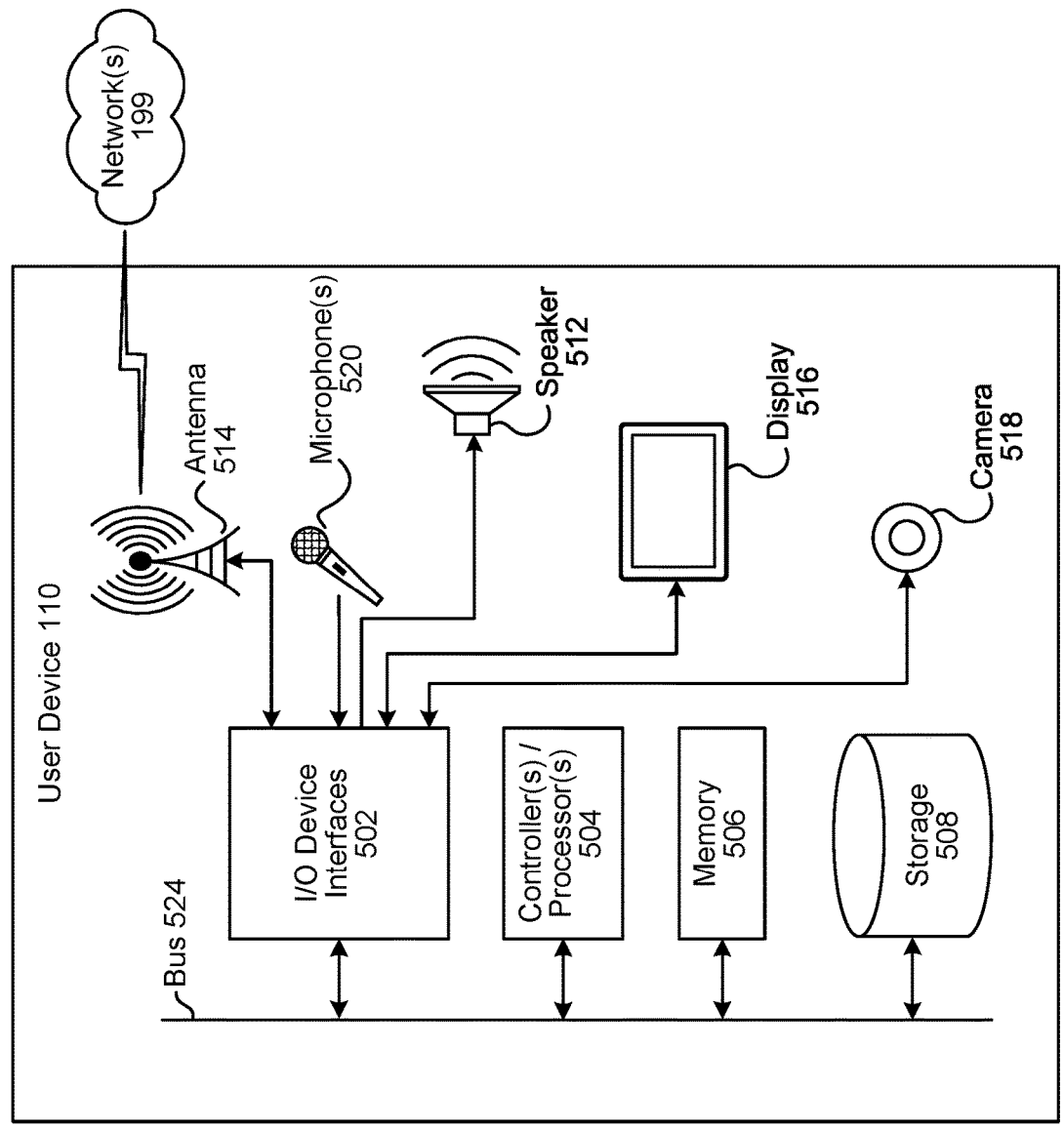
FIG. 5 is a block diagram conceptually illustrating example components of a device, according to embodiments of the present disclosure.
Figure 6:
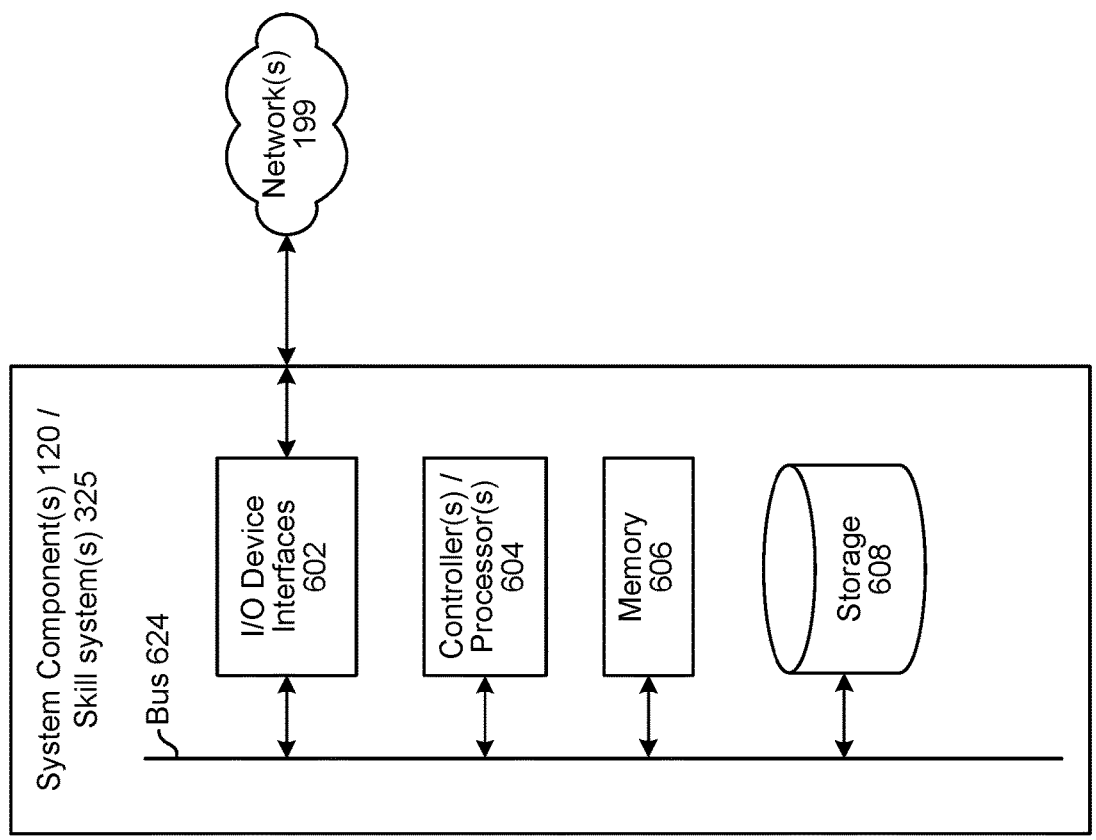
FIG. 6 is a block diagram conceptually illustrating example components of a system, according to embodiments of the present disclosure.

FIG. 5 is a block diagram conceptually illustrating a user device 110 of the system 100. FIG. 6 is a block diagram conceptually illustrating example components of a remote device, such as the system component(s) 120 and the skill(s) system 325. A system (120/325) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/325) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple components (120/325) may be included in the system 100 of the present disclosure, such as, one or more system components 120 and/or one or more skills 325. In operation, each of these systems may include computer-readable and computer-executable instructions that reside on the respective device (120/325), as will be discussed further below.

Each of these devices (110/120/325) may include one or more controllers/processors (504/604), which may each include a central processing unit (CPU) for processing data and computer-readable instructions, and a memory (506/606) for storing data and instructions of the respective device. The memories (506/606) may individually include volatile random access memory (RAM), non-volatile read only memory (ROM), non-volatile magnetoresistive memory (MRAM), and/or other types of memory. Each device (110/120/325) may also include a data storage component (508/608) for storing data and controller/processor-executable instructions. Each data storage component (508/608) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (502/602).

Computer instructions for operating each device (110/120/325) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120/325) includes input/output device interfaces (502/602). A variety of components may be connected through the input/output device interfaces (502/602), as will be discussed further below. Additionally, each device (110/120/325) may include an address/data bus (524/624) for conveying data among components of the respective device. Each component within a device (110/120/325) may also be directly connected to other components in addition to (or instead of) being connected to other components across the bus (524/624).

Referring to FIG. 5, the user device 110 may include input/output device interfaces 502 that connect to a variety of components such as an audio output component such as a speaker 512, a wired headset or a wireless headset (not illustrated), or other component capable of outputting audio. The user device 110 may also include an audio capture component. The audio capture component may be, for example, a microphone 520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 516 for displaying content. The user device 110 may further include a camera 518.

Via antenna(s) 514, the input/output device interfaces 502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (502/602) may also include communication components that allow data to be exchanged between devices such as different physical servers in a collection of servers or other components.

The components of the user device 110, the system component(s) 120, and/or skill 325 may include their own dedicated processors, memory, and/or storage. Alternatively, one or more of the components of the user device 110, the system component(s) 120, and/or skill 325 may utilize the I/O interfaces (502/602), processor(s) (504/604), memory (506/606), and/or storage (508/608) of the user device 110, the system component(s) 120, and/or skill 325, respectively.

As noted above, multiple devices may be employed in a single system. In such a multi-device system, each of the devices may include different components for performing different aspects of the system's processing. The multiple devices may include overlapping components. The components of the user device 110, the system component(s) 120, and the skill 325, as described herein, are illustrative, and may be located as a stand-alone device or may be included, in whole or in part, as a component of a larger device or system.

Figure 7:
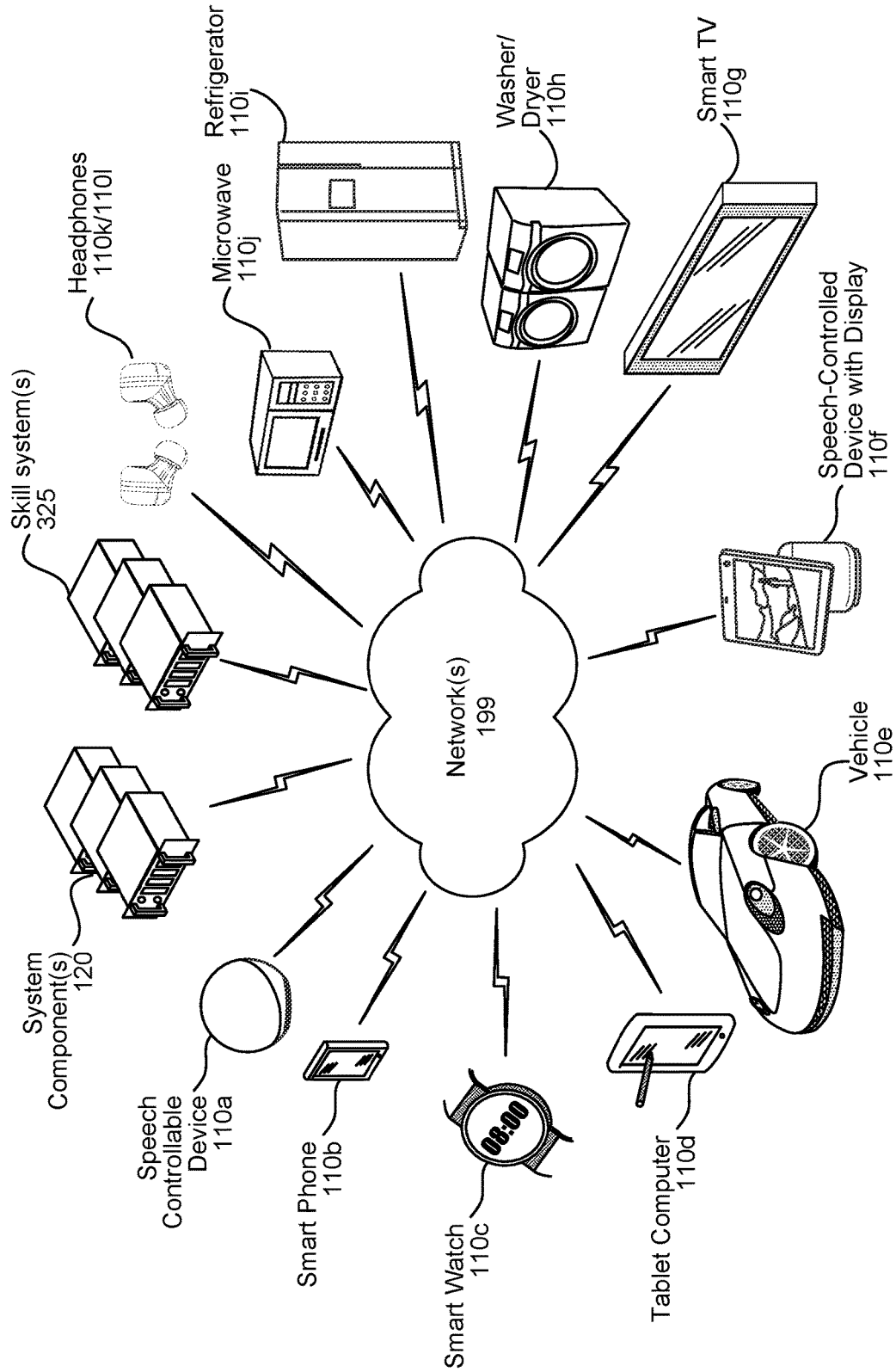
FIG. 7 illustrates an example of a computer network for use with the overall system, according to embodiments of the present disclosure.

As illustrated in FIG. 7, multiple devices (110a-110l, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable user device 110a, a smart phone 110b, a smart watch 110c, a tablet computer 110d, a vehicle 110e, a speech-controllable display user device 110f, a smart television 110g, a washer/dryer 110h, a refrigerator 110i, a microwave 110j, and/or earbuds/headphones 110k/110l may be connected to the network(s) 199 through a wireless service provider, over a Wi-Fi or cellular network connection, or the like. Other devices are included as network-connected support devices, such as the system component(s) 120, the skill 325, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving first audio data corresponding to a first spoken input;
processing the first audio data using an encoder to determine first encoded audio data;
processing the first encoded audio data using a machine learning model that is configured to determine at least a first chunk of the first encoded audio data corresponding to a first portion of the first spoken input and a second chunk of the first encoded audio data corresponding to a second portion of the first spoken input, wherein the second portion has a different duration than the first portion;

performing first automatic speech recognition (ASR) processing of the first chunk to determine a first plurality of word hypotheses;

performing second ASR processing of the second chunk to determine a second plurality of word hypotheses; and determining, using at least the first plurality of word hypotheses and the second plurality of word hypotheses, a first automatic speech recognition (ASR) hypothesis corresponding to the first spoken input.

2. The computer-implemented method of claim 1, wherein determining the first ASR hypothesis further comprises:

selecting a first word hypothesis from the first plurality of word hypotheses;

selecting a second word hypothesis from the second plurality of word hypotheses; and determining the first ASR hypothesis to include the first word hypothesis and the second word hypothesis.

3. The computer-implemented method of claim 1, further comprising:

receiving, at a user device, second audio data representing the first spoken input;

determining, at the user device, a set of audio frames from the second audio data; and processing, at the user device and using an audio encoder, the set of audio frames to determine the first audio data.

4. The computer-implemented method of claim 1, further comprising:

receiving second audio data corresponding to a second spoken input;

determining, from the second audio data, a first segment corresponding to a first word included in the second spoken input;

processing the first segment to determine a set of phonemes potentially corresponding to the first word;

determining first data representing a first set of audio frames, from the second audio data, that are associated with a first phoneme from the set of phonemes;

determining second data representing a second set of audio frames, from the second audio data, that are associated with a second phoneme from the set of phonemes; and determining, using the set of phonemes, the first data and the second data, output data responsive to the second spoken input.

5. The computer-implemented method of claim 1, further comprising:

receiving training audio data corresponding to a plurality of spoken inputs, the training audio data including at least first training audio data;

determining annotation data corresponding to the training audio data, the annotation data representing at least a first portion of the training audio data corresponding to a first word; and configuring a first component and a second component using the training audio data and the annotation data, wherein the first component is configured to determine chunks of encoded audio data corresponding to separate words, and the second component is configured to determine word hypotheses for individual chunks of encoded audio data.

6. The computer-implemented method of claim 1, wherein:

performing the first ASR processing of the first chunk further comprises:

determining a first fixed-size representation corresponding to the first chunk, and generating, using the first fixed-size representation, the first plurality of word hypotheses; and performing the second ASR processing of the second chunk further comprises:

determining a second fixed-size representation corresponding to the second chunk, the second fixed-size representation being a same size as the first fixed-size representation, and generating, using the second fixed-size representation, the second plurality of word hypotheses.

7. The computer-implemented method of claim 6, wherein;

the first portion precedes the second portion;

generating the second plurality of word hypotheses further comprises processing, using a decoder, the second fixed-size representation to determine the second plurality of word hypotheses; and generating the first plurality of word hypotheses further comprises processing, using the decoder, the first fixed-size representation to determine the first plurality of word hypotheses.

8. The computer-implemented method of claim 6, further comprising:

sending, to a second device, the first fixed-size representation and the second fixed-size representation to enable the second device to generate the first plurality of word hypotheses and the second plurality of word hypotheses.

9. A system comprising:

at least one processor; and at least one memory including instructions that, when executed by the at least one processor, cause the system to:

receive first audio data corresponding to a first spoken input;

process the first audio data using an encoder to determine first encoded audio data;

process the first encoded audio data using a machine learning model that is configured to determine at least a first chunk of the first encoded audio data corresponding to a first portion of the first spoken input and a second chunk of the first encoded audio data corresponding to a second portion of the first spoken input, wherein the second portion has a different duration than the first portion;

perform first automatic speech recognition (ASR) processing of the first chunk to determine a first plurality of word hypotheses;

performing second ASR processing of the second chunk to determine a second plurality of word hypotheses; and determine, using at least the first plurality of word hypotheses and the second plurality of word hypotheses, a first automatic speech recognition (ASR) hypothesis corresponding to the first spoken input.

10. The system of claim 9, wherein the at least one memory includes further instructions that, when executed by the at least one processor, further cause the system to determine the first ASR hypothesis at least in part by:

selecting a first word hypothesis from the first plurality of word hypotheses;

selecting a second word hypothesis from the second plurality of word hypotheses; and determining the first ASR hypothesis to include the first word hypothesis and the second word hypothesis.

11. The system of claim 9, wherein the at least one memory includes further instructions that, when executed by the at least one processor, further cause the system to:
  receive, at a user device, second audio data representing the first spoken input;
  determine, at the user device, a set of audio frames from the second audio data; and
  process, at the user device and using an audio encoder, the set of audio frames to determine the first audio data.

12. The system of claim 9, wherein the at least one memory includes further instructions that, when executed by the at least one processor, further cause the system to:
  receive second audio data corresponding to a second spoken input;
  determine, from the second audio data, a first segment corresponding to a first word included in the second spoken input;
  process the first segment to determine a set of phonemes potentially corresponding to the first word;
  determine first data representing a first set of audio frames, from the second audio data, that are associated with a first phoneme from the set of phonemes;
  determine second data representing a second set of audio frames, from the second audio data, that are associated with a second phoneme from the set of phonemes; and
  determine, using the set of phonemes, the first data and the second data, output data responsive to the second spoken input.

13. The system of claim 9, wherein the at least one memory includes further instructions that, when executed by the at least one processor, further cause the system to:
  receive training audio data corresponding to a plurality of spoken inputs, the training audio data including at least first training audio data;
  determine annotation data corresponding to the training audio data, the annotation data representing at least a first portion of the training audio data corresponding to a first word; and
  configure a first component and a second component using the training audio data and the annotation data, wherein the first component is configured to determine chunks of encoded audio data corresponding to separate words, and the second component is configured to determine word hypotheses for individual chunks of encoded audio data.

14. The system of claim 9, wherein the at least one memory includes further instructions that, when executed by the at least one processor, further cause the system to:
  perform the first ASR processing of the first chunk at least in part by:
    determining a first fixed-size representation corresponding to the first chunk, and
    generating, using the first fixed-size representation, the first plurality of word hypotheses; and
  perform the second ASR processing of the second chunk at least in part by:
    determining a second fixed-size representation corresponding to the second chunk, the second fixed-size representation being a same size as the first fixed-size representation, and
    generating, using the second fixed-size representation, the second plurality of word hypotheses.

15. The system of claim 14, wherein the first portion precedes the second portion, and wherein the at least one memory includes further instructions that, when executed by the at least one processor, further cause the system to:
  generate the second plurality of word hypotheses at least in part by processing, using a decoder, the second fixed-size representation to determine the second plurality of word hypotheses, and
  generate the first plurality of word hypotheses at least in part by processing, using the decoder, the first fixed-size representation to determine the first plurality of word hypotheses.

16. The system of claim 14, wherein the at least one memory includes further instructions that, when executed by the at least one processor, further cause the system to:
  send, to a second device, the first fixed-size representation and the second fixed-size representation to enable the second device to generate the first plurality of word hypotheses and the second plurality of word hypotheses.

* * * * *